United States Patent [19]

Jones, Jr.

[11] 4,068,237
[45] Jan. 10, 1978

[54] SYSTEM FOR LOCATING A RADAR TRANSMITTER

[76] Inventor: James R. Jones, Jr., 3452 Mercer Lane, San Diego, Calif. 92122

[21] Appl. No.: 700,991

[22] Filed: June 29, 1976

[51] Int. Cl.² .............................................. G01S 3/02
[52] U.S. Cl. ............................................... 343/112 C
[58] Field of Search ......... 343/112 R, 112 C, 112 PT, 343/15

[56] References Cited

U.S. PATENT DOCUMENTS

| 2,920,320 | 1/1960 | Ross | 343/112 PT |
| 3,947,804 | 3/1976 | Olson | 343/112 C |

Primary Examiner—Maynard R. Wilbur
Assistant Examiner—T. M. Blum
Attorney, Agent, or Firm—R. S. Sciascia; G. J. Ruben; T. M. Phillips

[57] ABSTRACT

A system for obtaining the range and bearing of the location of any radar transmission with a minimum of received data (one pulse). Three receiving systems spaced apart from each other receive signals from the radiating source. Solving three simultaneous equations for circles using the location of each receiving antenna as the center of three circles. The point of intersection of the three circles is the location of the radiating source.

2 Claims, 3 Drawing Figures

SYSTEM FOR LOCATING A RADAR TRANSMITTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Present techniques for locating the position of an unknown radar transmitter are based on establishing the bearing of the strongest signal level received. By comparing the bearings of strongest intercept at other locations the position of the radar transmitter may be established.

SUMMARY OF THE INVENTION

The present invention provides for a system for obtaining the range and bearing of any radar transmitter from what is considered an absolute minimum of received data, i.e., a single pulse of a radar transmission. Several radar receivers whose position and separation are known will receive the radar pulse at different time intervals. Each of the received signals is detected and fed to a time detection counter where the amount of time lapse for each pulse received is determined with reference to a reference clock pulse. The output from each time detection counter is a digital output and is used to modulate a laser beam. The modulated signal is fed through fiber optic lines to prevent signal radiation to a demodulator. The output of the demodulator is fed to a digital computer for computing the location from which the received pulse was transmitted based on the received data.

Accordingly, an object of the present invention is to provide a means of determining the coordinates of the origin of an unknown received transmitted radar signal.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
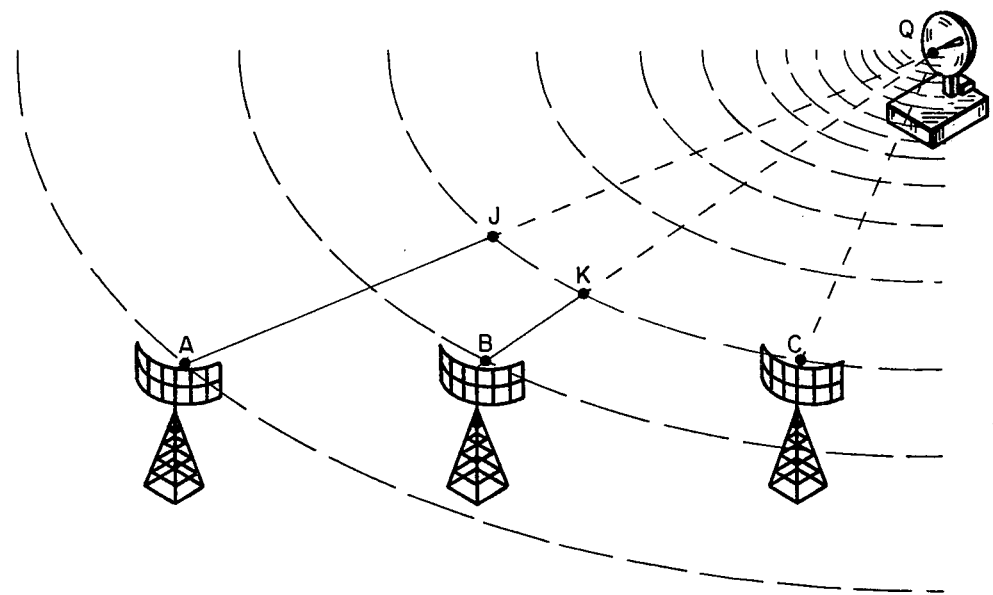
FIG. 1 shows the geometry of the system.

Referring now to FIG. 1 wherein there is shown a radar transmitter Q transmitting a radar signal from an unknown origin. Three radar receivers A, B, and C are positioned on a line and at known distances from each other. A radar signal transmitted from radar Q will be received at receiving site C in a given time. The same pulse will be received at antenna site B at a slightly greater time than the time to travel from Q to C and will be received at antenna site A at an even later time.

Figure 2:
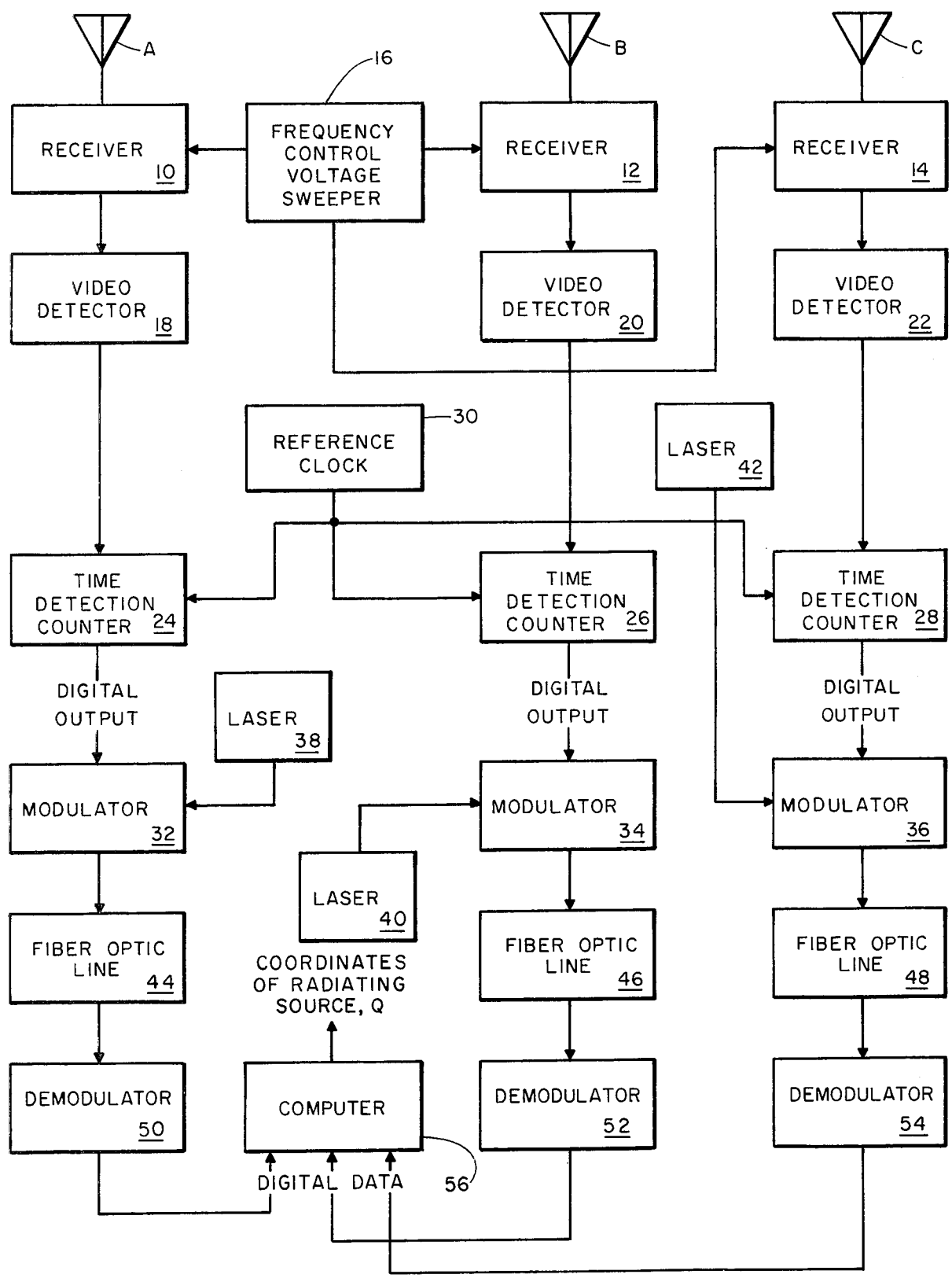
FIG. 2 is a block diagram of the preferred embodiment of the invention.

Referring now to FIG. 2 there are shown the three receiving antennas A, B and C. Antenna A feeds into receiver 10, antenna B feeds into receiver 16, and antenna C feeds into receiver 3. Each of receivers 10, 12 and 14 are controlled by frequency control source 16. The purpose of frequency control 16 is to ensure that each receiver is receiving in the same frequency band. The outputs from each of receivers 10, 12 and 14 are fed to video detectors 18, 20 and 22, respectively. The outputs from video detectors 18, 20 and 22 are fed to time detection counters 24, 26 and 28, respectively. The time reference signal for each of detection counter circuits 24, 26 and 28 is provided by a reference clock source 30. The digital output from each of the detection computers 24, 26 and 28 are fed as inputs to laser modulators 32, 34 and 36. The modulated laser beams from lasers 38, 40 and 42 are fed through fiber optic lines 44, 46 and 48, resspectively, to provide non-radiating signal transmission to demodulators 50, 52 and 54, respectively. The outputs from demodulators 50, 52 and 54 provide the three data inputs to computer 56 which is programmed to solve three simultaneous equations and provide an output which is the coordinates of the radiating source Q.

Figure 3:
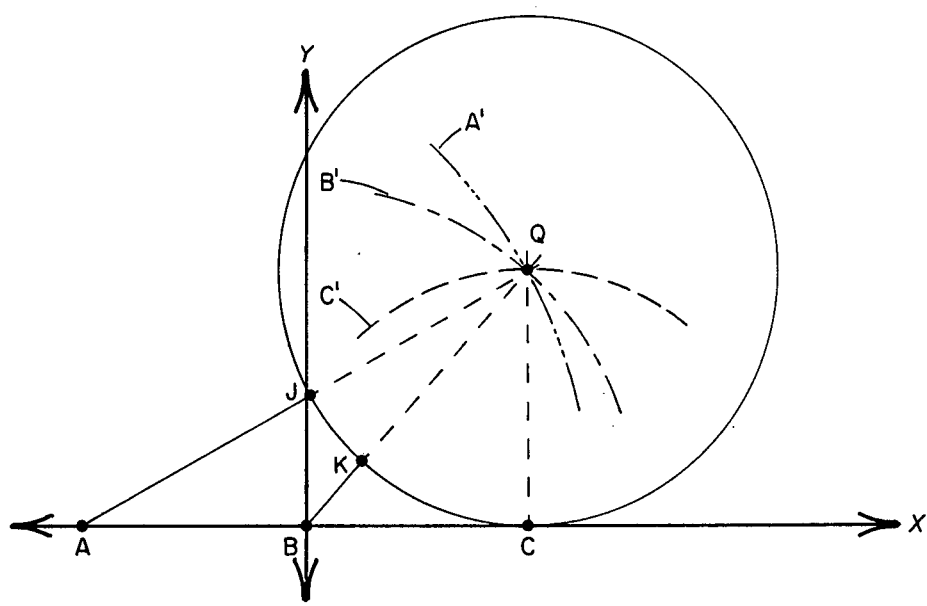
FIG. 3 illustrates the geometry involved in computing the coordinates of the radar transmitter.

Using the diagram of FIG. 3 and the equation for a circle, the three equations would be $$(X - CB)^2 + y^2 = \overline{QC}^2$$

$$x^2 + y^2 = \overline{QB}^2$$

$$(X - BA)^2 + y^2 = \overline{QA}^2$$

Laser modulators 32, 34 and 36 may be of any of the commercial available modulators such as the model 20 electro optical modulator using ADP crystal, manufactured by Coherance Associates. Demodulators 50, 52 and 54 may be of any of the commercially available demodulators such as the PIN-3 photo diode detector manufactured by United Detector Technology.

In operation, antennas A, B and C should be designed to receive signals in a 180° bearing arc and designed as a broad frequency band antenna. Radiations received at antenna A are passed to receiver 10 which has the same frequency bandpass as antenna A. The frequency of receiver 10 is controlled by frequency control voltage sweeper 16. Frequency control 16 generates a voltage which controls the frequency at which a radar pulse intercept may be made. The output of receiver 10 is fed to the video detector 10 which should be designed to detect pulse amplitude variation in the RF signal intercepted by antenna A. The video amplitude variations detected are fed to time duration counter 24. The output of reference clock 30 is the reference signal used by time duration counter 24. Time duration counter 24 measures the time duration following the arrival of the reference clock pulse to the arrival of an incoming radar pulse as supplied by the video detector 18. The time duration counter 24 measurement is given as a serial digital output signal and is used as the input to laser modulator 32. The modulated light beam is fed in a fiber optics line 44 (for non-radiating transmission) to demodulator 50 which again produces the serial stream of digital data for input to computer 56. The process of inputting the computer is identical for the signals received at antennas B and C.

Referring now to FIG. 3 wherein there is shown a mathematical model of the transmitting antenna Q and three receiving antennas in time and distance relationships. The physical characteristics of the radar pulse transmissions from transmitter Q are that they are essentially constant vectorial transmissions, having a fixed velocity, and have a dispersion or expanding beam pattern. As shown in FIG. 3 point Q is defined as a radar antenna having a beam pattern which would allow radiated RF energy to impact points A, B and C. Points A, B and C represent the three signal receiving systems shown in FIG. 2 where point A is antenna A, point B is antenna B and point C is antenna C. The distance A B and B C on line segment X is defined as the distance between antennas and are defined as a known quantity.

Based on the above, the theory of operation follows. If a radar pulse is transmitted by the antenna at point Q it will strike antenna C first. It will have traveled a time and proportional distance equivalent to radius Q C. The radiated pulse will also have traveled during the same time to points J and K in the direction of points A and B, respectively. Correspondingly, it will have reached point A in a time J A late compared to arrival at point C. Moreover, it will reach point B in a time K B late compared to its arrival at point C. Time late measurement is the essence of the theory of operation. Using points A, B and C as the center of circles and if the radii of the circles have small but equal quantities added they will continually expand and there will result a set of points where the circles A', B' and C' so constructed will cross each other. This set of points or locus of points are the result of an infinite set of simultaneous solutions for expanding circles where only one set of coordinates will satisfy the solution and this is point Q. If point Q moves a small amount and another locus is generated it will generate a unique point where the three circles cross. Computer 56 may be a general purpose computer such as the UNIVAC 1106 manufactured by Sperry Rand Corp., using standard programming for being programmed to solve for simultaneous solutions of circles using the locations A, B and C as the center of the circles and having radii proportional to the time for the pulse to travel from Q-A, Q-B and Q-C, respectively.

Obviously many modifications and variations of the present invention are possible in the light of the above teachings. It is therefore to be understood that within the scope of the appended claims the invention may be practiced otherwise than as specifically described.

What is claimed is:

1. A system for detecting the location of an unknown radar transmission the combination including:
   a. at least three radar receiving means positioned on a straight line and at a known distance from each other to receive radar transmission from radar transmitters having an unknown location,
   b. signal processing circuit means for processing at least one radar pulse signal received by each of said radar receiving means to provide at least three signals representing the respective distances each of said radar receiving means is located from said radar transmitter,
   c. a laser beam source,
   d. said signal processing circuit means including a reference clock pulse source, a time detection counter coupled to receive said radar pulse signal and to said reference clock source for measuring the time duration following the arrival of a reference clock pulse to the arrival of an incoming radar pulse and providing a digital output signal for modulating the output of said laser beam source,
   e. computer means coupled to said signal processing means for computing the location of said radar transmitter.

2. A system for detecting the location of an unknown radar transmission the combination including:
   a. at least three radar receiving means positioned on a straight line and at a known distance from each other to receive radar transmission from radar transmitters having an unknown location,
   b. signal processing circuit means for processing at least one radar pulse signal received by each of said radar receiving means, said processing circuit including at least one subsystem comprising,
     1. a receiver for receiving the received radar pulse signal,
     2. a video detector coupled to said receiver for detecting a received radar signal,
     3. a reference clock source,
     4. time detection counter means coupled to said video detector and to said reference clock source for providing a digital output signal representing a measured time after a radar signal has been detected,
     5. a laser beam source,
     6. modulator means coupled to said time detection counter and to said laser for providing a modulated laser beam signal,
     7. a fiber optics transmission line coupled to said modulator for transmitting said modulated signal in a non-radiating manner,
     8. demodulator means coupled to said transmission line for demodulating the transmitted signal to provide digital data suitable for use in a computer.

* * * * *